United States Patent [19]

Jäger et al.

[11] Patent Number: 4,510,831
[45] Date of Patent: Apr. 16, 1985

[54] DEVICE FOR CUTTING SHEET METAL AND THE LIKE

[76] Inventors: Theo Jäger, Huttenheimer Str. 46; Helmut Schmid, Kronenstrasse 10, both of 7522 Philippsburg-Rheinsheim, Fed. Rep. of Germany

[21] Appl. No.: 553,858

[22] Filed: Nov. 21, 1983

[30] Foreign Application Priority Data

Nov. 23, 1982 [DE] Fed. Rep. of Germany ....... 3243257

[51] Int. Cl.³ .......................... B26D 7/18; B26D 7/20
[52] U.S. Cl. ........................................ 83/157; 83/636
[58] Field of Search ................. 83/156, 157, 636, 644

[56] References Cited

U.S. PATENT DOCUMENTS 4,246,816  1/1981  Ivanoff ................................. 83/157
4,313,357  2/1982  Hawkins ............................... 83/157

Primary Examiner—Frank T. Yost
Assistant Examiner—Hien H. Phan

[57] ABSTRACT

In a cutting table for sheet metal and the like, the portion of the work that overhangs the table where it is cut is supported on a traveling adjustable support (9) having rollers on its upper surface. As the upper blade is brought down to cut the work progressively from the side near the pivot of the blade to the opposite side, a traveling carriage on which the traveling support is mounted is caused to move along the length of the cut so that it provides support to the work at the location where the blade is doing the cutting. The support is pivoted on an axis perpendicular to the cut so that it can adjust itself to the inclination of the upper cutting blade, the pivot being fixed on a vertically slidable member guided in the carriage. Hydraulically driven pistons enable the support to be raised or lowered with respect to the carriage. Wide cuts can thus be made without the strip that is cut off being twisted, coiled up, or otherwise deformed.

12 Claims, 5 Drawing Figures

DEVICE FOR CUTTING SHEET METAL AND THE LIKE

This invention concerns means for cutting sheets and thin plates of metal and similar material, having a lower cutting blade, usually at the edge of a table, and an upper cutting blade that can be lowered in such a way that it falls with a certain cutting angle relative to the lower blade running along the latter, a support that is yielding in the vertical direction being provided for bracing the strip of sheet metal that is to be cut off against the cutting force.

Such a cutting device is known from German published patent application No. (OS) 29 47 581. The support in this case is constituted as a carrier plate that extends along the entire length of the cut. It rests on a multiplicity of springs and is coupled to a hydraulic assembly for upward and downward movement. It has the function of supporting the strip of metal that is to be cut off during the cutting operation so that the bending and particularly the twisting of the sheet that would otherwise occur may be held within suitable limits.

Since in the cutting operation the upper cutting blade penetrates into the cutting material at a certain angle, and the part of the metal strip already cut off is carried down with the blade into this angular position, the known support plate of plane configuration comes to lie against the metal strip only in the end regions of the latter. It can accordingly fulfill its support function only at the beginning and the end of the cutting operation. In the predominant intermediate region the sheet metal is left without support while subjected to the effect of the cutting force. The known support can accordingly prevent the distorting or buckling of the strip only in the case of relatively small cutting length.

SUMMARY OF THE INVENTION

It is an object of the present invention to improve the kind of cutting device above described so that it may be suitable for a substantially greater cut length. In particular, the support for the cut off strip should exhibit a more effective support capability.

Briefly, the support is constituted as a movable support on a carriage running under the upper cutting blade along the length of the latter, which travels along the underside of the sheet metal during the cutting operation approximately in step with the shift of the cutting location from the beginning of the cut to the end.

By the support provided according to the invention by means of a carriage, it is assured that the support will always be provided where it is effectively needed, i.e. in the immediate neighborhood of the cutting location, which is to say in the so-called cutting triangle and in the adjacent region of the metal strip that has already been separated. The invention thus permits an optimal provision of support and pressure in the critical distortion region. The deformations of the separated metal strip which heretofore occurred in the case of the greater cut lengths are prevented by a device that is reliable in operation.

There is a further advantage that the two point support of the metal strip mentioned above is no longer to be feared, so that the cutting angle of the upper cutting blade can be increased. This leads to lower cutting forces and permits design of a machine that has more favorable overall cost. Finally, it is possible by means of the invention to cut thick metal sheets without risk of coiling up the excess strips.

It is useful for the carriage to be arranged to travel below the horizontal guide of the cutting device and to carry a vertically displaceable support surface at its upper end. In that way the advantage is obtained that the stroke of the upper cutting blade is absorbed only by the support surface and a fixed horizontal guide is sufficient for the carriage. The vertical displaceability of the support surface is so designed that even at the lowest position of the upper cutting blade, no damage of the supporting surface can occur.

It has also been found desirable for the support surface to be equipped with rollers disposed one behind the other in the direction of travel of the support surface. In consequence, when the carriage travels only little friction is produced between its support surface and the sheet metal lying thereon. Furthermore, the preferably cylindrical rollers exert a good friction and directing effect on the strip that is cut off. The metal strip can be braced with this embodiment of the moving support with a relatively high pressure applied between the support surface of the carriage and the upper knife beam.

In order that the support surface can accommodate itself as well as possible to the inclination of the cut off strip which depends upon the cutting angle of the cutting blade, the support surface is mounted in a swing-permitting manner on a horizontal pivot axis running perpendicularly to the direction of travel of the carriage. The support effect is then independent of the cutting angle.

For developing some compression of the strip between the carriage and the upper cutting blade it is desirable for the support surface to be capable of being raised by two hydraulically actuated pistons located at the two sides of the pivot axis of the support surface, while the latter is at the same time free to swing on the pivot axis. The position of the pistons on both sides of the pivot axis makes sure that the force is exerted to press the metal against the cutting blade and does not stand in the way of the fitting of the supporting surface to the inclination of the strip as desired. The pressing forces for optimal fitting to the cutting operation can advantageously be preselected in a stepless choice of magnitude.

The drive of the carriage can take place separately with an adjustable speed. On the other hand, it can also be derived directly from the cutting blade drive, so that the synchronization of the carriage speed with the cutting speed will automatically result. Since with a different cutting angle the coordination of the downward movement of the upper cutting blade and the travel speed of the carriage changes, a gear drive of variable gear ratio can be interposed. In that way, it becomes possible, for example, to reduce the speed of travel of the carriage when the cutting angle becomes greater.

BRIEF DESCRIPTION OF THE DRAWINGS

The invention is further described by way of illustrative example with reference to the annexed drawings, in which.

DESCRIPTION OF ILLUSTRATED EMBODIMENTS

Figure 1:
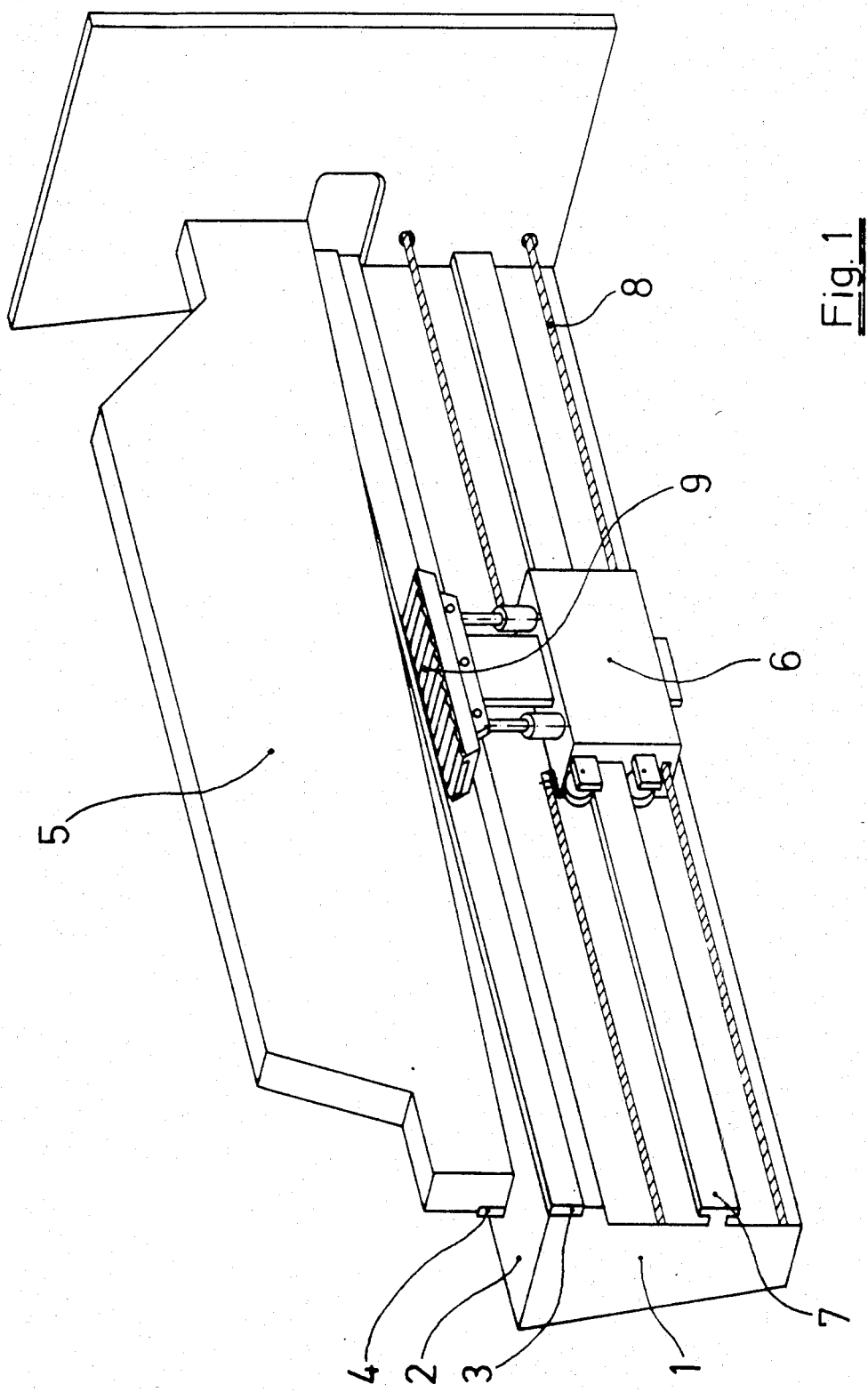
FIG. 1 is a perspective view of a cutting device according to the invention as seen from the workpiece delivery side.

FIG. 1 shows schematically a machine bed 1 with a table-like top surface 2 on which the sheet metal to be cut may be placed. The lower cutting blade 3 is set flush in a long edge of the table 2 so that the upper edge of this shearing element forms the end of the table surface 2.

The upper cutting or shearing blade 4 is located on a knife beam 5 which is mounted in a manner not further shown in the drawing that permits the blade 4 to be swung through an angle of inclination to the lower blade 3 so as to provide a progressive shearing action beginning near the pivot end. The knife blade 5 can be swung downward by machinery not further shown, so that the two cutting blades 3 and 4 operate together as a pair of shears and a piece of sheet metal projecting over the edge of the lower blade 3 will be cut right through.

Beneath the knife beam 5 is a carriage 6 arranged to travel horizontally along a rail 7 fastened to the machine bed 1. Its drive is provided, in the illustrated example, by a chain loop 8, means not shown in the drawing serving for moving the chain. The carriage 6 thus can be caused to travel parallel to the cutting blade 3 from one edge of the machine to the other.

Figure 3:
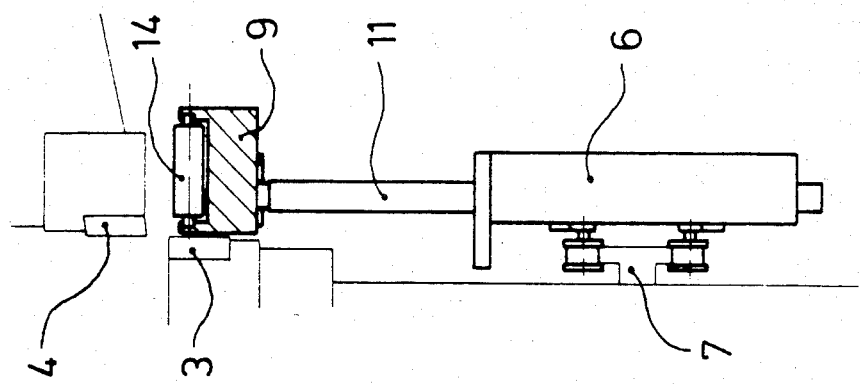
FIG. 3 is an end view, in elevation, of the carriage corresponding to the face view of FIG. 2.
Figure 2:
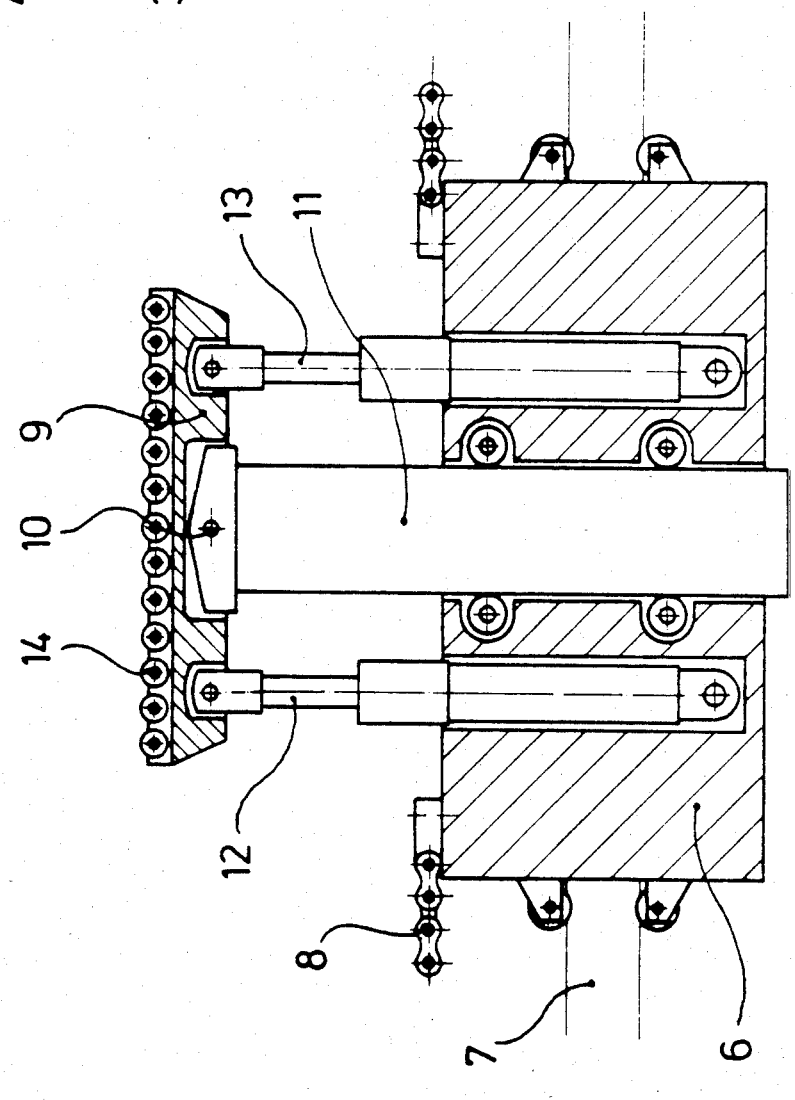
FIG. 2 is an elevation view of the carriage of the cutting device, on a magnified scale.
Figure 5:
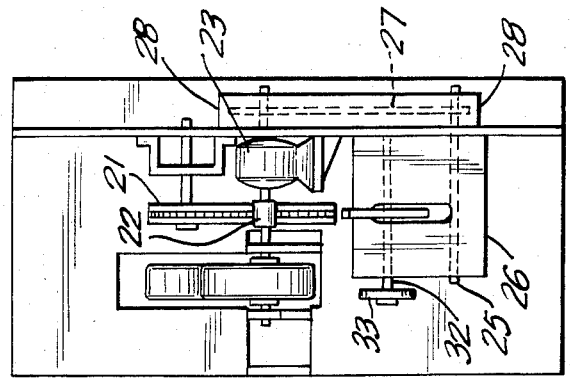
FIG. 5 is an end view, likewise merely in schematic representation, of the cutting device of FIG. 4 together with the drive for the beam 5 and the carriage 6.

As FIGS. 2 and 3 show particularly in detail, the carriage 6 has a support surface 9 mounted above it. This support surface is mounted so as to be able to swing about a horizontal axis perpendicular to the direction of travel of the carriage 6, being pivotally supported on the apex of a guide piece 11. The raising and lowering of the support surface 9 is produced by two pressure-actuated pistons 12 and 13 respectively on both sides of the guide piece 11, which run vertically in corresponding hydraulic cylinders mounted in the carriage 6. Both hydraulic cylinders are connected to the same pressure medium loop in such a way that the supporting surface 9 can carry out its swinging movement about the axis 10 independently of the pressure force exerted in the hydraulic cylinders and thus fit its position to the inclination of the upper cutting blade.

The top of the support surface 9 is equipped with a multiplicity of rolling bodies in the form of cylindrical rollers 14. The axes of these rollers are disposed parallel to the axis of pivoting 10 of the support surface 9, so that when the carriage is driven under the sheet metal piece not shown in the drawing, the rollers will revolve. These rollers not only provide protection against deformation of the metal strip that is cut off, particularly twisting, but they also produce an intensive straightening and flattening of the sheet metal.

There are many possibilities also for controlling the support force for the supporting surface 9. Instead of the use of hydraulic cylinders, the support can be provided, for example, mechanically by spring elements or pneumatically. It is also within the concept of the invention to operate the support, instead of with a constant supporting force, with a force that is reduced at the beginning and the end of the cutting operation, since the cutting forces are smaller there.

The function of the device is as follows. The sheet metal to be cut is put into the machine from the side which in FIG. 1 lies behind the cutting beam 5. It is so disposed on the table-like surface that the desired line of cut is flush with the edge of the lower cutting blade 3. At this time the carriage 6 is located in its extreme position at the right-hand end of its rail in FIG. 1. Its support surface 9 is raised until its underside lies against the sheet metal.

When the cutting operation is begun, the upper cutting blade 4 cuts what is in FIG. 1 the right-hand edge of the sheet metal and presses the projecting portion downward against the support surface 9. The support surface 9 is thereby gradually pressed down, so that a certain prescribed counter-pressure builds up in the hydraulic cylinders. This counter-pressure provides the desired support and bracing of the sheet metal in the critical deformation region.

As the knife beam swings downward, the cutting zone in the sheet metal gradually moves from right to left through the metal sheet. Synchronously with that movement, the carriage 6 is driven from right to left, so that its support surface always remains in the critical deformation region of the sheet metal. Because of its pivoted mounting on the guiding piece 11, the support surface automatically fits the operative cutting angle. The strip of metal cut off is finally removed either by an ejector driven into the support surface 9 or by tipping down the support surface.

The knife beam 5 is shown in the illustrated example as a swinging shear. Instead of that, of course, a different kind of motion and guiding can be used, for example a purely vertical guide for an obliquely cutting blade.

The drive for the carriage 6 is not shown in FIG. 1 except for the chain 8. Various possibilities of implementation are offered to the machine shop operator. What needs to be observed is merely that the drive should run synchronously with the cutting speed.

Figure 4:
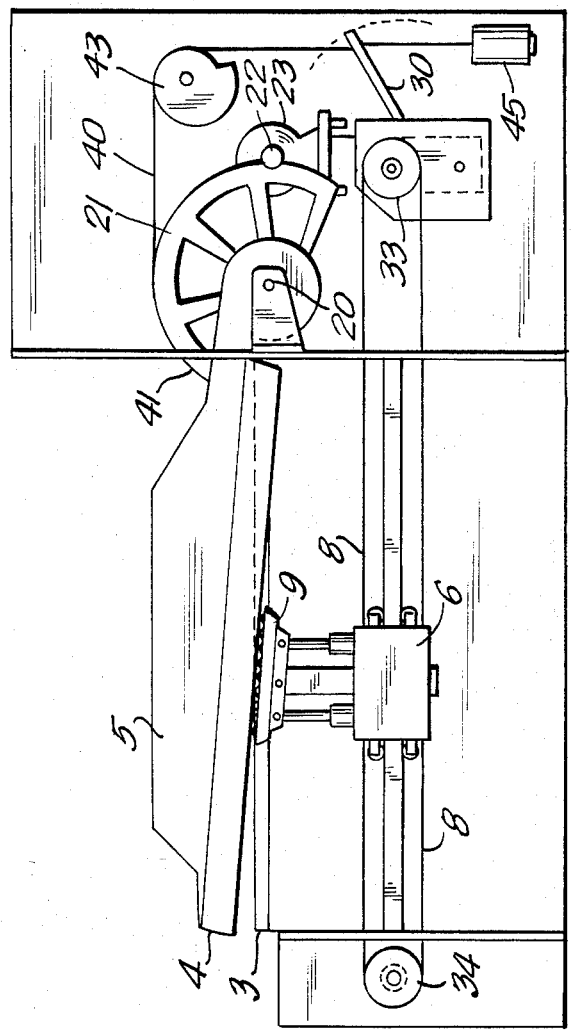
FIG. 4 is a schematic face view symbolically illustrating the derivation of the drive for the carriage 6 from the drive for the knife beam 5.

FIG. 4 illustrates the derivation of the drive for the carriage 6 from the drive for the knife beam 5. The knife beam 5 swings on an axle 20 which also carries a large radius sector gear 21. The gear 21 and with it the knife beam 5 is driven by a worm gear 22 on the shaft of an electric motor 23. In practice, limit switches would be provided so that the motor could be started with a push button to lower the beam 5 and then to raise it without the operator having to decide when the operation is complete and there would be a stop button for stopping it in the middle of its stroke, but these are omitted from the drawing and this description for reasons of simplification. The motor 23 also operates the drive shaft 25 of a variable ratio transmission 26, power being transferred by the motor to the shaft 25 either by a chain drive or a counter shaft, both symbolically designated at 27, located in the box 28.

The transmission 26 is of the kind that has a V-belt connecting conical pulleys having a fixed and a movable slant (not shown) so that the effective radius of one can be increased while that of the other is reduced by a cam system, not shown, in response to movement of a control lever 30. Such variable ratio transmissions are well known and need not be further described here.

The output shaft 32 of the variable transmission 26 drives the sprocket 33, which in turn drives the chain 8 that moves the carriage 6 in a manner already described with respect to FIG. 1.

A chain or a barred tape 40 is affixed at the stud 41 to the sector 21 and passes over a cam pulley 43 from which it hangs down to the point where it is attached to the lever 30. A weight 45 is suspended from the extremity of the lever 30 to keep the chain or barred tape 40 stretched. The cam wheel 43 operates to adjust the displacement of the lever 30 in response to the downward movement of the beam 5 so as to provide the appropriate gear ratio for driving the chain 8 in such a way as to keep the support member 9 of the carriage 6 centered on the location where the knife blade 4 is cutting the workpiece by a shearing action against the knife blade 3. The workpiece is not shown in FIG. 4 to simplify the drawing. Many other ways of coordinating the drives for the knife beam 5 and for the carriage 6 are of course possible, both mechanically and electrically.

In summary, the advantage of the invention consists in that the carriage provides a local support that is always found in the critical deformation region, so that large cut lengths are possible without the danger of deformation of the metal strip that is cut off. In addition, the local support permits enlarging the cutting angle, so that the machine as a whole can be designed for smaller cutting forces.

Although the invention has been described with reference to a particular illustrative example, therefore, it will be seen that still further variations and modifications are possible within the inventive concept.

We claim:

1. Device for cutting sheet metal and similar materials, having a lower cutting blade and a cooperating upper cutting blade that is lowerable so as to run at a certain cutting angle relative to the lower cutting blade, having also a support lying below the upper cutting blade for bracing a strip to be cut off against the cutting force, said support being guided so as to be yieldable in the vertical direction, and having also the improvement comprising;
    a carriage for said support mounted for travel below said upper cutting blade along the length thereof, so that said carriage performs the function of said support for bracing said strip, and
    means for causing said carriage to move along its path of travel substantially in synchronism with the shift of the location of cutting by said blades along the length of said blades and in the same direction.

2. Device according to claim 1, wherein a horizontal guide (7) is affixed to said device, along which guide said carriage (6) is required to travel by being movably mounted thereon, and wherein said support (9) for said strip is provided in the upper portion of said carriage and is mounted in vertically shiftable fashion on said carriage.

3. Device according to claim 1, wherein said carriage is equipped with a succession of rollers arrayed at the top for rolling engagement with said strip.

4. Device according to claim 2, wherein said support member of said carriage is equipped with a succession of rollers arrayed along its top for rolling engagement with said strip.

5. Device according to claim 2 in which said support member is pivoted on a horizontal axis, said axis being perpendicular to the direction of travel of said carriage and being fixed with reference to a guide member shiftable vertically within vertically guiding means provided in said carriage.

6. Device according to claim 5, wherein pressure-responsive vertically movable pistons are provided in said carriage, disposed on opposite sides of said pivot axis, for raising and lowering of said support member of said carriage.

7. Device according to claim 1, wherein powered means are provided for driving said upper cutting blade and wherein said means for causing said carriage to move along its path of travel are connected to a drive derived from said means for driving said upper cutting blade.

8. Device according to claim 7, wherein a variable ratio gear coupling is provided in said derived drive means for taking account of the operative cutting angle in the operation of said upper cutting blade.

9. Device according to claim 2, wherein powered means are provided for driving said upper cutting blade and wherein said means for causing said carriage to move along its path of travel are connected to a drive derived from said means for driving said upper cutting blade.

10. Device according to claim 5, wherein powered means are provided for driving said upper cutting blade and wherein said means for causing said carriage to move along its path of travel are connected to a drive derived from said means for driving said upper cutting blade.

11. Device according to claim 9, wherein a variable ratio gear coupling is provided in said derived drive means for taking account of the operative cutting angle in the operation of said upper cutting blade.

12. Device according to claim 10, wherein a variable ratio gear coupling is provided in said derived drive means for taking account of the operative cutting angle in the operation of said upper cutting blade.

* * * * *